July 17, 1962

C. B. FRANCIS 3,044,868

RECOVERY OF BY-PRODUCTS OF WASTE PICKLE LIQUOR

Filed Sept. 14, 1959

INVENTOR.
CHARLES B. FRANCIS.
BY
Christy, Parmelee and Strickland
ATTORNEYS.

July 17, 1962  C. B. FRANCIS  3,044,868
RECOVERY OF BY-PRODUCTS OF WASTE PICKLE LIQUOR
Filed Sept. 14, 1959  3 Sheets-Sheet 2

INVENTOR.
CHARLES B. FRANCIS.
BY
Christy, Parmelee and Strickland
ATTORNEYS.

INVENTOR.
CHARLES B. FRANCIS.
BY
*Christy, Parmelee and Strickland*
ATTORNEYS.

United States Patent Office 3,044,868
Patented July 17, 1962

3,044,868
RECOVERY OF BY-PRODUCTS OF WASTE PICKLE LIQUOR
Charles B. Francis, Pittsburgh, Pa., assignor to Puriron and Chemicals, Inc., a corporation of Pennsylvania
Filed Sept. 14, 1959, Ser. No. 839,838
10 Claims. (Cl. 75—29)

This invention relates to the disposal of spent sulfuric acid in such way that harmful pollution of the streams and water ways of the country is avoided. More particularly, the invention concerns the production of iron powder and sulfuric acid or other sulfur compounds from mixtures of iron oxides, and/or iron hydrates, and calcium sulfate, such as the mixtures of these substances obtained by treating spent sulfuric pickling acid with slaked lime or calcium hydroxide. The invention consists in certain new and useful improvements in method.

Hitherto, the leading method used for the disposal of the 1,000,000 or more gallons of spent sulfuric pickling acid (commonly known as pickle liquor) daily produced in the United States is first to add slaked lime to the liquor until the mixture becomes slightly alkaline, at which time the calcium hydroxide reacts with both the free acid and ferrous sulfate, thus:

(I) $H_2SO_4 + Ca(OH)_2 \rightarrow CaSO_4 + 2H_2O$
(II) $FeSO_4 + Ca(OH)_2 \rightarrow CaSO_4 + Fe(OH)_2$ Air is bubbled through the mixture of water and suspended solids to oxidize the ferrous hydroxide to ferric hydroxide, and then the solids are separated from the water either by filtering or settling to form a so-called acid sludge. The sludge, amounting to some 2,000 net tons obtained from 1,000,000 gallons of pickle liquor, has heretofore been discarded by dumping. The dumping of these solids has been costly and difficult, resulting in the daily loss of recoverable products in the form of more than 250 tons of sulfuric acid, 500 tons of iron and 800 tons of quick lime (CaO).

It is the object of the present invention to recover these valuable materials, and to reduce the cost of disposing of pickle liquor—indeed, to realize a profit in such disposition.

Explemplary apparatus in which the invention may be practiced is illustrated in the accompanying drawings, wherein.

Figure 1:
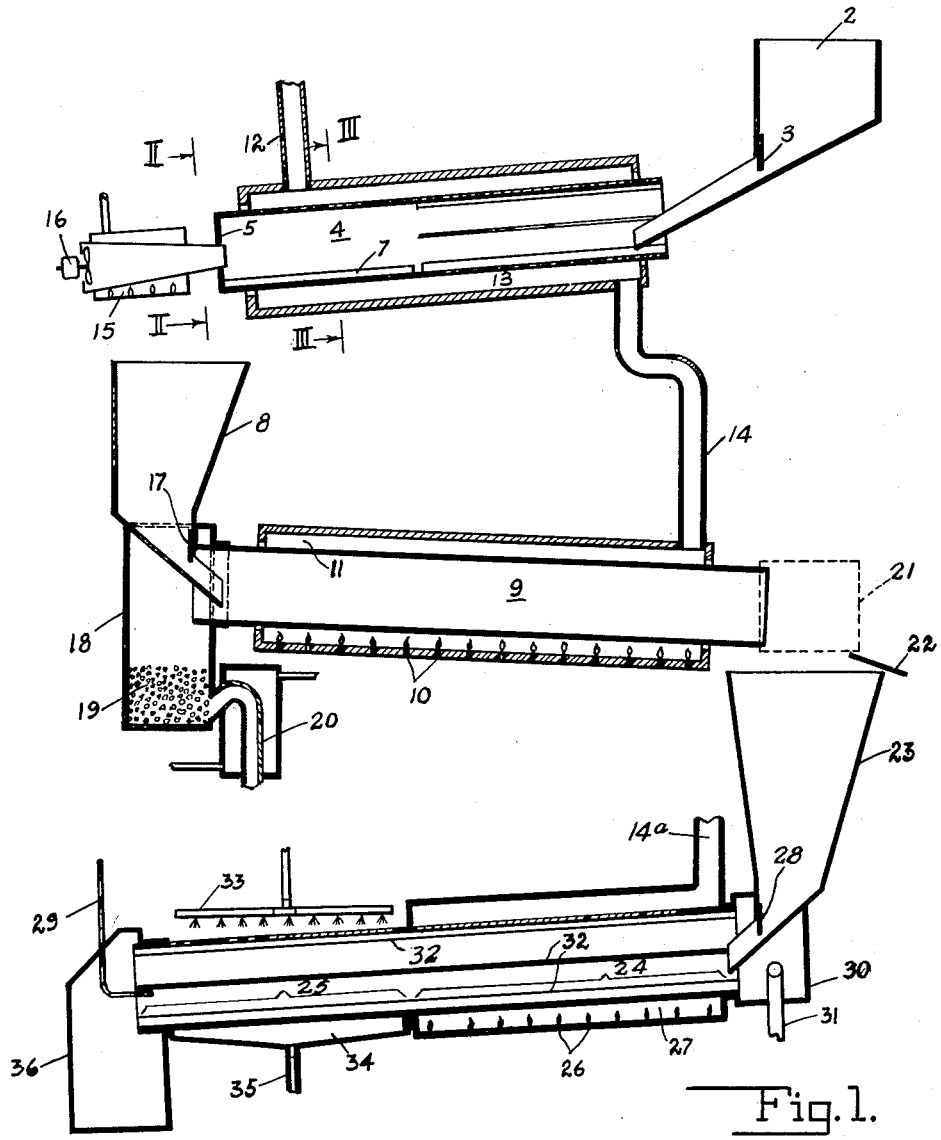
FIG. 1 is a diagrammatic view of the apparatus, as seen in vertical section.
Figure 2:
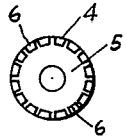
FIG. 2 is a view in end elevation of a certain drying and grinding unit of the apparatus, as seen on the plane II—II of FIG. 1.
Figure 3:
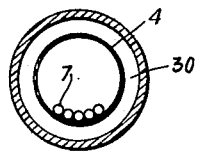
FIG. 3 is a cross sectional view of said unit, as seen on the plane III—III of FIG. 1.
Figure 4:
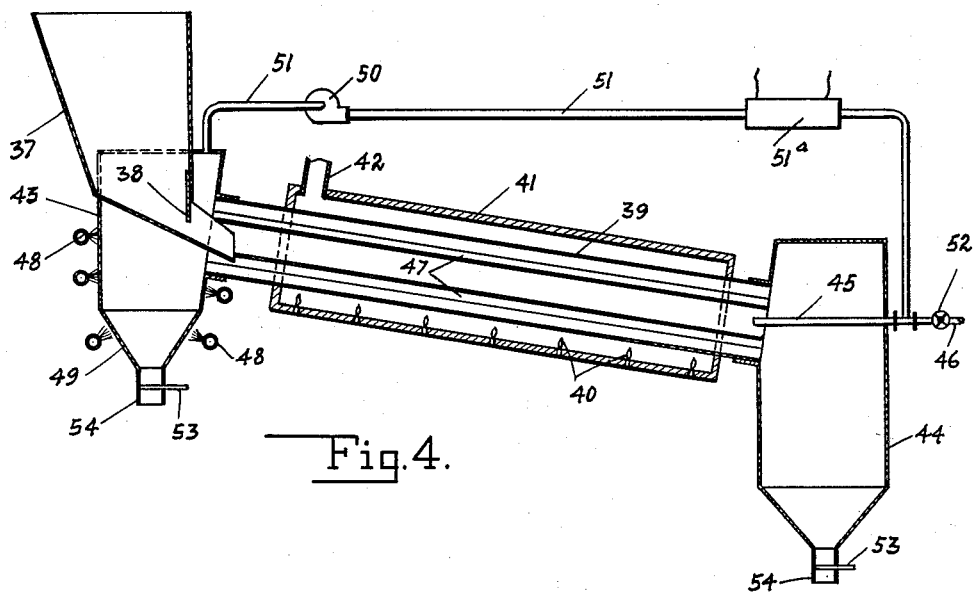
FIG. 4 is a diagrammatic view of apparatus, as seen in vertical section, for separating powdered iron from a comminuated mixture of such iron and calcium oxide.

The sludge or filter cake obtained by the neutralization and aeration of waste sulfuric pickle liquor comprises a mixture of calcium sulfate, $CaSO_4$, and ferric hydroxide, $Fe(OH)_3$. Referring to the drawings the sludge is fed into an inclined dryer kiln 4; conveniently the sludge is fed from a supply hopper 2, controlled by a slide valve 3, into the kiln. If the sludge is in the form of filter cake it is first comminuated to a particle size that will permit the desired controlled flow from the hopper into the kiln. The kiln is provided in its lower portion with a plurality of steel grinder bars 7 that in this case are eight feet in length and two inches in diameter, and are retained in the lower end of the kiln 4 by means of an end plate 5 that is peripherally slotted (as at 6 in FIG. 2) to permit the material advancing through the kiln to be discharged into the feed hopper 8 of a dissociating kiln or retort 9. The kiln 9 may be heated by fluid-fuel burners 10 in a combustion chamber 11 that envelops the kiln.

The dryer kiln 4 is heated to above 220° F. but less than the dissociation temperature of calcium sulfate, by the products of combustion drawn from the combustion chamber 11 of kiln 9, the said products of combustion flowing through a duct 14 into chamber 13 under the draft of a stack 12, shown fragmentarily. It is important to note that air, heated by a pre-heater 15 to about 500° F., is blown through the dryer 4 by a motor-driven fan 16. The air at this temperature flows counter to the mixture of ferric hydroxide and calcium sulfate advancing right-to-left through the kiln, and this heated air not only accelerates the drying of the mixture, but also prevents water vapor released in the kiln from condensing on the relatively cool sludge mixture entering the kiln. As the mixture of calcium sulfate and ferric hydroxide is dried, heated and ground or pulverized in its progress through the kiln the following chemical reaction occurs:

(III) $2Fe(OH)_3 \rightarrow Fe_2O_3 + 3H_2O$

The calcium sulfate remains stable in the dryer kiln; the water produced as a vapor in the conversion of the ferric hydroxide to ferric oxide is discharged through the upper open end of the kiln, and a comminuted dry mixture of ferric oxide and calcium sulfate is discharged into the feed hopper 8, whence the mixture flows at a rate regulated by a slide valve 17 into the dissociator kiln or retort 9 which is heated to the decomposition temperature of the calcium sulfate in the mixture. More specifically, the retort 9 is so heated that the temperature of the mixture is raised to about 1450° F., at which temperature, with the ferric oxide serving as a catalyst, the following reaction occurs:

(IV) $3CaSO_4 + Fe_2O_3 \rightarrow 3CaO + Fe_2O_3 + 3SO_2 + 3O$

The hot gaseous mixture of sulfur dioxide ($SO_2$) and oxygen (O) escapes from the upper end of the kiln 9 into a header, whence such gases flow through a catalyst, in the form of a bed of ferric oxide pellets 19, into a duct 20. In the course of such flow through the catalytic bed the sulfur dioxide is oxidized to sulfur trioxide, thus:

$$3SO_2 + 3O \rightarrow 3SO_3$$

The sulfur trioxide (under the propulsion of a fan, not shown) is delivered by duct 20 to an apparatus for production of sulfuric acid by the absorption process. The several forms of apparatus for this purpose are well known in the art, wherefore a description of them herein is unnecessary to an understanding of the invention. Suffice it to say that the sulfur trioxide produced is absorbed in 98% sulfuric acid, thereby forming oleum or disulfuric acid ($H_2S_2O_7$). The oleum is then diluted with 60 degree sulfuric acid to form 98% acid, half of which is recirculated to absorb additional sulfur trioxide, while the other half of the 98% acid may be diluted with 50% acid to form 60 degree acid for use in pickling, or otherwise.

In flowing through the dissociator kiln any organic material carried from the acid sludge into the heated mixture is oxidized, whereby the hot dry mixture of calcium oxide and ferric oxide is a desulfurized and decontaminated material ready to enter the reduction kiln 24.

The hot, dry, desulfurized and decontaminated mixture of calcium oxide and ferric oxide is delivered at the lower end of the kiln 9 into a cylindrical screen 21 that rotates with the kiln. Any particles in the mixture that are oversize are ejected to a chute 22 and collected for reprocessing while the particles of proper size drop into a hopper 23.

The mixture of calcium oxide and ferric oxide may be treated with water and used like white wash, or the mixture may be charged into a steel melting or refining furnace to reduce or eliminate carbon in the melt and to form a basic slag.

By way of improvements with accompanying economic and practical advantages, I prefer to reduce the ferric oxide in the mixture in order to obtain a mixture of comminuted iron and calcium oxide.

In my copending application for a United States Letters Patent, Serial No. 809,100, filed April 27, 1959, I disclose a method of chemically and thermally separating the calcium, sulfur, and ferrous compounds found in pickle liquor sludge before iron powder is produced. In my present process it will be noted that, after the sulfur compounds are driven off under the effect of heat, I first treat the mixture of calcium oxide and ferric oxide to reduce the powdered ferric oxide therein to iron powder, and then I separate the powdered iron from the calcium oxide. Many practical and economic advantages may thus be realized in the treatment of the waste pickle liquor.

The art is familiar with many methods of reducing ferric oxide, such as the well-known H-iron process, or one of the several rotary kiln processes, or one of the several batch processes, and in exemplary way I shall describe herein a rotary retort process which I presently prefer for the purpose.

Again referring to the drawings, a rotary retort or kiln is provided, comprised of two sequential sections 24 and 25. The section 24 is heated by burners 26 that fire into a combustion chamber 27 that encompasses the kiln section 24. The products of combustion flow into a duct 14a that may, if desired, be connected to the duct 14 leading to the heating chamber of the dryer kiln 4.

The comminuted mixture of calcium and ferric oxides, while it advantageously retains the heat applied to it in the dissociator kiln, is fed at a rate controlled by a slide valve 28 from the hopper 23 into the reducing retort section 24, where it is heated to from 700 to 1450° F. and exposed to a reducing atmosphere in the kiln. The reducing atmosphere may comprise hydrogen, or a mixture of hydrogen and carbon monoxide, delivered by supply pipe 29 into the lower end of the kiln 24, 25. The kiln is provided internally with longitudinally extending vanes or blades 32 secured to the kiln wall, and as the kiln rotates the mixture in its advance in right-to-left direction is repeatedly raised in the kiln and dropped, whereby the individual particles of the mixture are exposed repeatedly to intimate contact with the reducing atmosphere and with the heated walls of the kiln section 24. Assuming that the reducing atmosphere is composed of hydrogen alone, the ferric oxide in the particulate mixture advancing through the reducing section 24 of the kiln is reduced, as follows:

(VI) $\quad Fe_2O_3 + 6H \rightarrow 2Fe + 3H_2O$

The water vapor thus produced and any unreacted hydrogen escape into a stationary header 30 whence the vapor and gas are drawn away by a pipe 31 for recovery of the unused hydrogen and the separation of the water vapor therefrom. A simple condensation process may be used well within the skill of the engineer.

As the mixture advancing through the kiln reaches the end of reducing section 24, the composition of the mixture is iron powder and finely divided calcium oxide. This mixture, with continuity of the movements described, enters the cooling kiln section 25. The kiln section 25 is cooled by water flowing from sprays 33 over the wall of the kiln and draining into a pan 34 then empties into a drain pipe 35. The mixture is raised and dropped in its advance and thereby the particles of the mixture are repeatedly removed from contact with the kiln wall and dropped through the stream of hydrogen (flowing from supply pipe 29 through the cooling kiln section 25 to the heated reduction section 24) and back into contact again with the cool wall of kiln section 25. Not only is a very efficient cooling of the mixture obtained, but a substantial part of the heat in the mixture leaving the reducing kiln section becomes effective to preheat the hydrogen for reduction of the ferric oxide in the said reducing kiln section. This preheating of the hydrogen with salvaged heat minimize the cost of fuel for the endothermic reduction of the ferric oxide in the mixture. Indeed, the calcium oxide in the mixture delivered by the dissociation kiln becomes a vehicle of heat which, added to the heat applied to the ferric oxide in the dissociator kiln, plus the salvaged heat in the preheated hydrogen, furnishes practically all of the heat required for the reduction of the ferric oxide, whereby in normal operation the burners 26 need develop not much more heat than that required to overcome radiation losses.

The cooled mixture of calcium oxide and iron powder is delivered into a header 36 at the discharge end of the kiln section 25, and from time to time the header is opened and the accumulated mixture removed.

In accordance with my present invention the mixture is processed to separate the iron from the calcium oxide, and this may be accomplished in one or more of several methods, as follows:

*Method A.*—The mixture of iron and calcium oxide may be charged into an electric arc furnace and leveled rapidly. Carbon in the form of coal or coke is spread on the top of the charge; the electrodes of the furnace are then lowered into position above the charge and operated on the indirect arc principle to heat the charge from the top. The iron particles in the charge are melted and the carbon on the charge prevents the iron particles from burning in the presence of the oxygen and intense heat in the furnace. The iron particles melt and settle to the bottom of the furnace, forming a molten pool of iron beneath an overlying layer of calcium carbide, it being noted that the carbon applied to the charge reacts with the calcium oxide to form calcium carbide, thus:

(VII) $\quad CaO + 2C \rightarrow CaC_2 + O$

Ferrosilicon may be added to the molten iron, to form silicon ferrite, the most efficient or effective metal of which to form electrical sheets. When the desired composition of metal has been established the furnace is tilted and the metal runs out first, after which the calcium carbide is discharged. Usually a ladle is provided to receive the metal from the furnace and all or part of the calcium carbide. At least enough calcium carbide is discharged into the ladle to form a blanket on the metal that prevents oxidation of the metal. Any calcium carbide in excess of that used to form said blanket may be fed into a second ladle or other receptacle, or allowed to drop to the floor adjacent to the furnace for later removal.

Aluminum pigs may be introduced to the metal in the ladle to degasify or "kill" the heat, it being understood that such use of aluminum causes no impairment of the desired magnetic properties of the metal when rolled into sheets. From the ladle the metal may be teemed into ingot molds and the resulting ingots may be rolled into electrical sheets, while the calcium carbide recovered provides a valuable material for use in the production of acetylene.

In modification, the melt of iron in the furnace may be used as the base metal for making high grade stainless steel, as by the addition of ferrochrome and nickel, etc., in proper proportions. Furthermore, the melt may be used as the base metal for producing a wide range of tool steels or other ferrous alloys, the details of which need not concern this specification.

If it be desired to recover calcium oxide rather than calcium carbide from the furnace, the introduction of carbon is omitted. To protect the particulate iron in the charge from burning or oxidizing in the furnace, a layer of calcium oxide, about ½" thick, is spread upon the charge and then the electrodes are brought into play to melt the iron particles and form a pool of molten iron beneath a layer of calcium oxide. The furnace is emptied in the manner already described, except that calcium oxide instead of calcium carbide is recovered with the metal.

The calcium oxide may be put to many uses in the industrial, chemical and agricultural fields. Preferably, the calcium oxide may be returned to the pickling line for use in neutralizing spent sulfuric pickling acid. The new pickle liquor sludge thus produced may be processed in the manner herein described.

*Method B.*—The hot mixture of iron powder and calcium oxide may be fed into a hopper 37 and delivered therefrom, at a rate controlled by a slide valve 38, into a heated reaction vessel into which carbon monoxide is introduced. The reaction vessel may take the form of a rotating inclined kiln 39 heated by the combustion gases developed by burners 40 in a combustion chamber 41 having a vent stack 42. Stationary header chambers 43 and 44 are sealed to the upper and lower ends, respectively, of the rotating kiln 39, and through header chamber 44 a pipe 45 extends for delivering preheated carbon monoxide (CO) from a supply line 46 into the kiln. As the comminuted mixture of iron and calcium oxide enters the rotating kiln vanes 47, fixed to and extending inwardly from the kiln wall, operate repeatedly to raise and drop the mixture in its advance from the upper to the lower end of the kiln. The mixture thus advancing through the kiln is heated to about 700° F. in the atmosphere established by the carbon monoxide admitted through pipe 45, and under such condition the carbon monoxide reacts with the iron to produce iron carbonyl, thus:

(VIII) 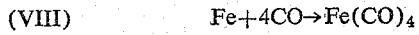 $Fe + 4CO \rightarrow Fe(CO)_4$

The iron carbonyl formed remains as a vapor at the elevated temperature maintained in the kiln, and the carbon monoxide flowing from pipe 45 into the lower end of the kiln promotes the flow of the iron carbonyl vapor into the header chamber 43, which is cooled by means of water sprays 48 played upon the steel walls of such chamber. The iron carbonyl vapor entering the chamber 43 is cooled, and the iron in the vapor is caused to precipitate in extremely finely divided form and to settle into the hopper-like bottom 49 of the chamber. The released carbon monoxide rises through the iron carbonyl vapor entering the chamber 43. A pump 50 serves to draw the released carbon monoxide from the top of chamber 43, via a pipe 51, and to return it to the pipe 45 for reuse in the rotating kiln. An electric heater 51a may be applied to the pipe 51 to reheat the recycled carbon monoxide. By means of a valve 52 in the supply line 46 the required amount of "new" carbon monoxide is admitted to the recycled carbon monoxide, to make-up for the small quantities of the gas lost through leakage.

Thus, the iron is removed as iron carbonyl vapor from the mixture advancing through the kiln, leaving the calcium oxide to be discharged into hopper-bottomed chamber 44. A slide valve 53 is provided in the outlet passage 54 of each of chambers 43 and 44, and from time to time the valves 53 may be opened and the accumulated iron drawn from chamber 43 and calcium oxide from chamber 44.

It is needless to mention the great commercial value of the iron powder thus produced, while the calcium oxide may be used in the neutralizing of spent pickling acid, or otherwise.

Figure 5:
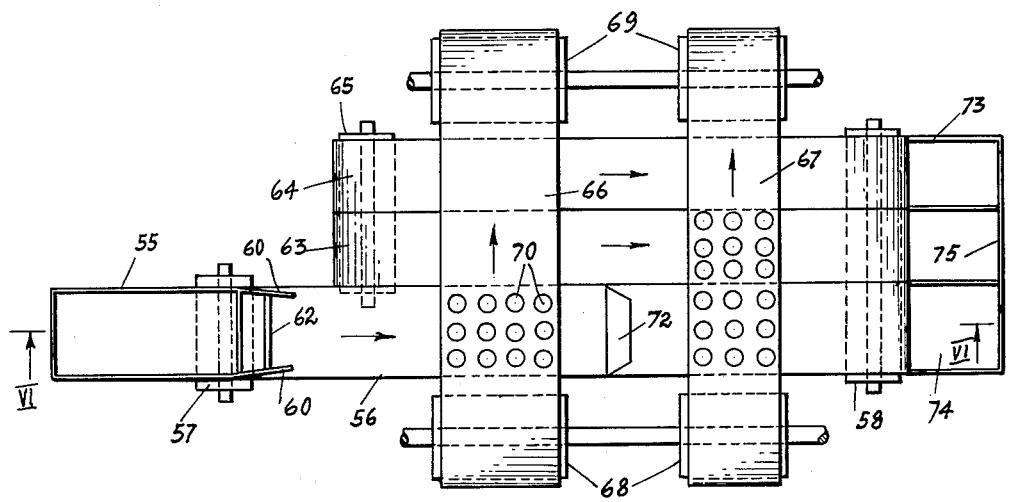
FIG. 5 is a diagrammatic view in plan of apparatus for separating iron powder from a comminuted dry mixture of such powder and powdered calcium oxide.
Figure 6:
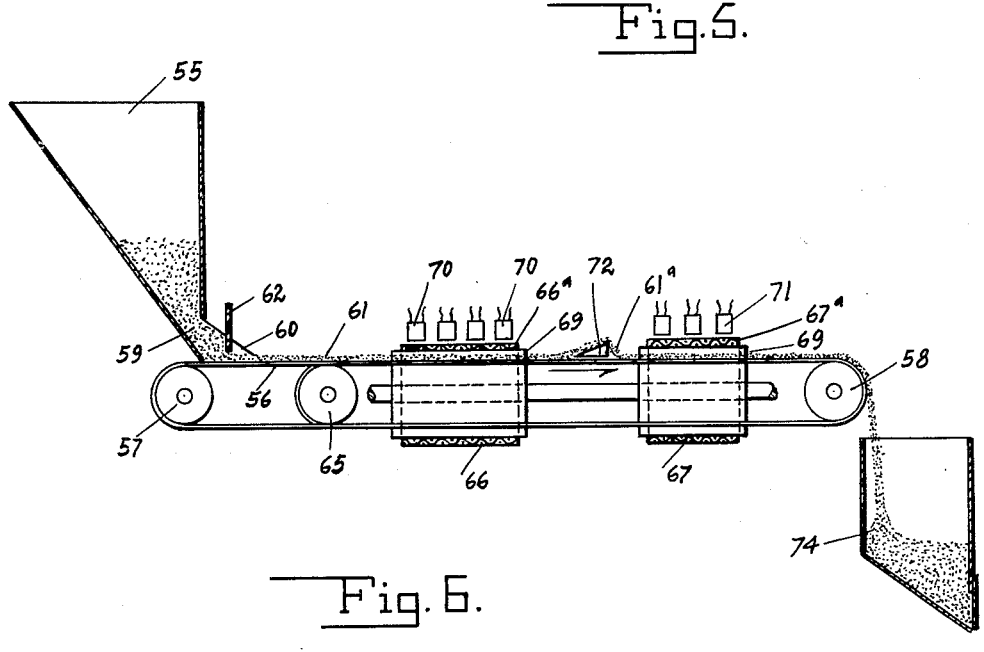
FIG. 6 is a diagrammatic view in vertical section of the apparatus as seen on the plane VI—VI of FIG. 5.

*Method C.*—In some cases it may be desirable physically to separate, by a so-called dry method, the powdered iron from the calcium oxide in the mixture coming from the reducing and cooling kiln 24, 25, and for this purpose the apparatus of FIGS. 5 and 6 is exemplary. The comminuted mixture is fed from a hopper 55 to the top surface of the upper reach of a belt 56 which is trained and supported upon powerfully driven rollers 57 and 58. The mixture flowing through the slot 59 at the bottom of hopper 55 is laterally confined to the width of belt 56 by means of two guide plates 60, that are appropriately inclined, as viewed from above, FIG. 5. The depth of the layer 61 of the mixture progressively laid on the belt, as it travels in the direction indicated by an arrow, is controlled by a vertically adjustable gauge blade 62.

Contiguous and parallel to belt 56 is a belt 63 and contiguous and parallel to belt 63 is a belt 64, as shown in FIG. 5. The belts 63 and 64 may be trained and supported at their right-hand ends on the same driven roller 58 that supports the corresponding end of belt 56, while the left-hand ends of belts 63 and 64 may be trained in common upon a roller 65. The mechanical organization is such that the upper reaches of all three belts extend and travel uniformly in a common plane.

Two transverse belts 66 and 67 are trained and supported on rotating rollers 68 and 69, in such relation that their upper reaches move in the direction of the arrows appearing in FIG. 5. In FIG. 6 it will be seen that the belts 66 and 67 are arranged to embrace or envelop the belt 56 and its associate belts 63 and 65, whereby the upper reaches 66a and 67a of such belts overlie and are spaced from the top surfaces of the upper reaches of belts 56, 63 and 64 by an interval slightly exceeding the depth of the layer 61 of the comminuted mixture deposited on the belt 56. The belts 66 and 67 are spaced apart a suitable distance from each other in the common direction of travel of the belts 56, 63 and 64.

The belts are constructed of non-magnetic material, such as cotton or synthetic fabric impregnated or reinforced with rubber or other plastic material. Above the top surface of the belt 63, and within the area thereof which is common to the area of the belt 56 immediately below it, a plurality of electro-magnets 70 is supported in spaced and fixed relation. The faces of the magnetically attracting poles of the magnets are positioned upon or in close proximity to the top surface of the reach 66a of belt 66. In this case twelve magnets 70 are illustrated. When the magnets are energized, as they continuously are during the operation of the apparatus, they attract the magnetic particles of iron from the comminuted mixture of iron and calcium oxide in the layer 61 to the nether surface of reach or flight 66a of traveling belt 66, and the iron particles, thus drawn from the mixture and adhering to the bottom surface of flight 66a, are carried out of range of the magnetic attraction of magnets 70 and into position above the upper flight of belt 63, whereupon the iron particles drop upon belt 63 and are carried thereon toward belt 67. Thus, as the belt 56 travels in the direction indicated iron particles are withdrawn from the mixture in layer 61 and deposited on belt 63.

All of the iron particles in the traveling layer 61 may not be removed by the magnets 70, wherefore the operation may be repeated as often as desired or need be. For example, a group of electro-magnets 71, eighteen in number here, is arranged over that area of belt flight 67a which is coextensive with the upper reaches of companion belts 56 and 63, and these magnets 71 are caused to effect a separation of the iron particles remaining in the layer 61 as it leaves the effect of magnets 70, and to carry the iron particles of the second separation to the belt 64. The iron particles deposited on belt 64 are transported to and discharged into a receptacle 73. In order to promote the efficiency of this secondary separation, a plow blade 72 is fixed in position adjacent to the top surface of belt 56. The structure and arrangement of this plow blade are such that, as the belt 56 travels, the layer 61 of comminuted material is swept upward upon and over the plow blade and deposited again on the belt surface. In the course of such movement the particulate material of the layer 61 is inverted as it falls from the plow blade 72 back upon the belt, this action being indicated at 61a in FIG. 6. This agitation and inversion of the material enhances the efficiency of the magnets 71 in withdrawing residual iron particles from layer 61, with the effect that the material delivered by belt 56 into receptacle 74 is calcium oxide, with inclusions of iron particles to such a minor degree that the oxide may be effectively used for the neutralizing of spent pickling acid.

It has been found that the iron particles removed by the first-stage magnets 70 from the layer 61 may have minute, dust-like particlse of calcium oxide adhering to them, and for this reason the material deposited on belt 63 is subjected to a second magnetic effect; that is, to the effect of the magnets 71, nine in this case, that cooperate with the area of the upper flight 67a of belt 67 that is coextensive with that portion of the area of belt 63 below it. As the particles on belt 63 are carried beneath the upper flight of belt 6 the iron particles are drawn from the surface of belt 63 and deposited on belt 64 along with the iron particles removed by the secondary separation from the material on belt 56. The material remaining on belt 63 and discharged into receptacle 75 is almost unadulterated calcium oxide. Thus, receptacle 73 contains iron powder with a minimum of included calcium oxide, receptacle 74 contains calcium oxide with unobjectionable inclusions of iron powder, and receptacle 75 contains calcium oxide with a minimum of included iron particles. It will be apparent to the engineer that the number and sequence of the magnetic separation steps may be varied to give practically any desired degree of purity of separated product.

In the practice described herein under "Method A" the mixture of iron and calcium oxide may be subjected to one or more magnetic separations before introduction to the melting furnace.

Figure 7:
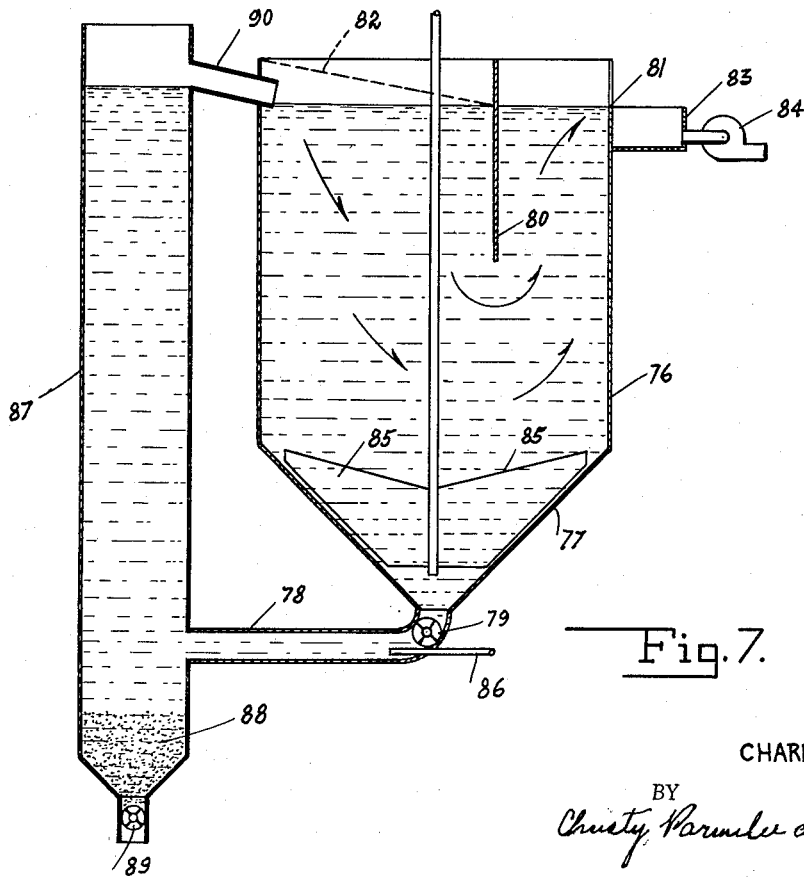
FIG. 7 is a diagrammatic view in vertical section of apparatus for effecting the separation of iron powder from said mixture by a wet method.

*Method D.*—A wet method may be used for separating the two ingredients in the mixture of powdered iron and calcium oxide. A typical apparatus for the purpose is shown diagrammatically in FIG. 7. The apparatus comprises a vessel 76 of circular horizontal cross section having a conical hopper-like bottom 77 that opens in an outlet 78 controlled by a valve 79. A transverse partition 80 is secured in the vessel 76, with the lower edge of the partition located at a substantial interval above the bottom of the vessel, as shown in FIG. 7. With the valve 79 closed, the vessel is filled with water up to the level of a weir 81 formed in the wall of the vessel, and above the surface of the water an inclined screen 82 is supported, the mesh size of the screen being such as to pass the particles of the mixture.

In the practice of the method quantities of the mixture are distributed upon the top of screen 82, the distribution preferably being made continuously at desired rate. The particles of the mixture fall through the screen into the water, and the volume of water displaced thereby flows over the weir 81 into a bosh 83, whence it may be drained by means of a pump 84. As the particles of iron powder and calcium oxide enter the water the calcium oxide reacts with the water to form calcium hydroxide. Under the effect of the material entering the vessel 76 the water moves downwardly on the right-hand side of the partition 80, then moves under the lower edge of the partition and upwardly on the right-hand side thereof to the weir 81. Such movement of the water is indicated by the arrows in FIG. 7. Due to the fact that the specific gravity of the iron powder is greater than that of the calcium hydroxide formed when the calcium oxide reacts with the water, the iron powder settles in the water faster than the calcium hydroxide, and it is important to note that the mixture of iron powder and calcium oxide is fed through screen 82 at such rate that movement of water downwardly on one side of partition 80 and upwardly on the other side is at such velocity that, as the water makes its 180 degree turn below the lower edge of partition 80, the relatively heavy particles of iron powder are not carried upwardly on the right-hand side of the partition but continue to settle to conical bottom 77 of the vessel. The water moving in the direction of the arrows does, however, travel at a velocity adequate to carry the calcium hydroxide with it, whereby the calcium hydroxide is carried into the bosh 83. The water-calcium hydroxide mixture entering the bosh is excellent for use in neutralizing spent sulfuric pickling acid, and for this purpose the mixture may be delivered in tank trucks, or it may be propelled through a pipe-line by pump 84, to the point where the spent acid is to be neutralized.

It may be noted that as the mixture enters the liquid in the vessel 76 the hydrogen or other gas adhering to the iron particles of the mixture is given up, whereby the powdered iron, with a density of about twice that of calcium hydroxide, settles readily in the manner described. The iron settling to the bottom of vessel 76 is kept from building upon the wall of the conical hopper 77 by means of slowly rotated scraper vanes 85, and collects in the bottom of said hopper. From time to time the valve 79 is opened and the accumulated iron powder is forced, under the head of the water above it, into the duct 78. A jet of water under pressure is directed by a pipe 86 into the duct 78 and this forces the iron powder into a tower 87. The powdered iron accumulates, as at 88, in the bottom of the tower, whence it may be removevd by opening a valve 89, while the liquid rises and fills the tower to the point where it overflows through a pipe 90 into the vessel 76.

It will be perceived, therefore, that this wet process may be conducted continuously, and that it provides an effective method for separating the iron powder from the calcium oxide in the mixture delivered by the reducing and cooling kiln or retort 24, 25.

The iron powder produced in either Method C or Method D may be compressed into bricquettes or pellets to provide iron melting stock free from carbon. And needless to say, the iron produced in either of said methods may be melted and processed in any steel-producing furnace.

It will be understood that within the terms of the appended claims other variations and modifications than those described herein may be adopted without departing from the spirit of the invention.

I claim:

1. The method herein described which includes treating spent sulfuric pickling acid with lime and air to provide a sludge comprised of calcium sulfate and iron oxide, drying and grinding the sludge to provide a dry mixture of calcium sulfate and ferric oxide and subjecting such mixture to a dissociation temperature and thereby driving off and recovering the sulfur oxides from the calcium sulfate to provide as a charge component for a steel-producing furnace a dry mixture of calcium oxide and ferric oxide.

2. The method herein described which comprises treating spent sulfuric pickling acid with lime and forming a mixture composed principally of calcium sulfate and iron oxide, drying the mixture and subjecting it to a dissociation temperature and thereby driving the oxides of sulfur from the calcium sulfate of the mixture, reducing the iron oxide in the mixture in the presence of heat and a reducing agent and charging the mixture into a melting furnace and forming from the said mixture a pool of molten iron beneath a blanket of molten calcium oxide for further treatment.

3. The method herein described which comprises treating spent sulfuric pickling acid with lime and forming a mixture composed principally of calcium sulfate and iron oxide, drying the mixture and subjecting it to a dissociation temperature and thereby driving the oxides of sulfur from the calcium sulfate of the mixture, subjecting the mixture to a temperature of about 700° F. in the presence of carbon monoxide and thereby separating the iron from the mixture in the form of iron carbonyl vapor, and cooling such vapor to effect the precipitation of the iron therefrom.

4. The method herein described of treating a comminuted mixture of iron and calcium oxide which comprises subjecting the mixture to a temperature of approximately 700° F. in the presence of carbon monoxide and thereby separating the iron from the mixture in the form of iron carbonyl vapor, and cooling such vapor to effect the precipitation of the iron therefrom.

5. The method herein described which comprises treating spent sulfuric pickling acid with lime and forming a mixture composed principally of calcium sulfate and iron oxide, drying the mixture and subjecting it to a dissociation temperature and thereby driving the oxides of sulfur from the calcium sulfate of the mixture, reducing the iron oxide in the presence of heat and a reducing agent, and subjecting the mixture to the effect of a magnetic field and thereby withdrawing iron from the mixture.

6. The method herein described which comprises treating spent sulfuric pickling acid with lime and forming a mixture composed principally of calcium sulfate and iron oxide, drying the mixture and subjecting it to a dissociation temperature and thereby driving the oxides of sulfur from the calcium sulfate of the mixture, reducing the iron oxide in the presence of heat and a reducing agent, and introducing the mixture to a body of water and thereby converting the calcium oxide to calcium hydroxide while separating the iron therefrom.

7. The method herein described which comprises subjecting to a reducing gas a comminuted intimate mixture of iron oxide and calcium oxide at a reacting temperature of from 700° to 1450° F. and reducing the iron oxide to provide a mixture of particulate iron and calcium oxide in the solid phase, and charging the latter mixture into a furnace and therein melting the mixture and forming a pool of molten iron beneath a blanket of molten calcium oxide for further treatment.

8. The method herein described which comprises subjecting to a reducing gas a comminuted intimate mixture of iron oxide and calcium oxide at a reacting temperature of from 700° to 1450° F. and reducing the iron oxide to provide a mixture of particulate iron and calcium oxide in the solid phase, charging the latter mixture into a furnace and therein melting the mixture and forming a pool of molten iron beneath a blanket of molten calcium oxide, and charging carbon into said blanket for reaction with the molten calcium oxide thereof to form calcium carbide adapted to be flushed from the furnace.

9. The method herein described which comprises subjecting to a reducing gas a comminuted intimate mixture of iron oxide and calcium oxide at a reacting temperature of from 700° to 1450° F. and reducing the iron oxide to provide a mixture of particulate iron and calcium oxide, charging the latter mixture into a furnace and therein melting the mixture and forming a pool of molten iron beneath a blanket of molten calcium oxide, and charging carbon into said blanket for reaction with the molten calcium oxide and thereof to form calcium carbide adapted to be flushed from the furnace.

10. The method herein described which comprises treating spent sulfuric pickling acid with lime and forming a mixture composed principally of calcium sulfate and iron oxide, comminuting and drying the mixture and subjecting it to a dissociation temperature and thereby driving off and recovering the oxides of sulfur from the calcium sulfate of the mixture, reducing the iron oxide in the mixture in the presence of heat and a reducing agent, and thereafter separating the reduced iron from the calcium oxide.

References Cited in the file of this patent

UNITED STATES PATENTS

| | | |
|---|---|---|
| 890,233 | Jones | June 9, 1908 |
| 1,484,670 | Petinot | Feb. 26, 1924 |
| 2,132,149 | Edwin | Oct. 4, 1938 |
| 2,500,553 | Lykken | Mar. 1, 1950 |
| 2,639,222 | Tanski | May 19, 1953 |

OTHER REFERENCES

Hoak: Article in "Industrial and Engineering Chemistry," vol. 39 (1947), pp. 614–618.